United States Patent
Natarajan et al.

(10) Patent No.: US 7,839,780 B2
(45) Date of Patent: Nov. 23, 2010

(54) DYNAMIC TRAFFIC REARRANGEMENT TO ENFORCE POLICY CHANGES IN MPLS NETWORKS

(75) Inventors: Narayanan Natarajan, Marlboro, NJ (US); Abdelhakim Hafid, Laval (CA)

(73) Assignee: Telcordia Technologies, Inc., Piscataway, NJ (US)

( * ) Notice: Subject to any disclaimer, the term of this patent is extended or adjusted under 35 U.S.C. 154(b) by 700 days.

(21) Appl. No.: 11/393,255

(22) Filed: Mar. 30, 2006

(65) Prior Publication Data

US 2007/0237160 A1    Oct. 11, 2007

(51) Int. Cl.
*H04L 12/26* (2006.01)

(52) U.S. Cl. .................... 370/230.1; 370/231; 370/235; 370/395.21; 370/395.5; 709/224; 709/226

(58) Field of Classification Search ................ 370/230, 370/230.1, 231, 235, 252, 395.21, 395.5, 370/400, 401; 709/220–226
See application file for complete search history.

(56) References Cited

U.S. PATENT DOCUMENTS

| 6,665,273 | B1 | 12/2003 | Goguen et al. |
| 6,915,445 | B2 | 7/2005 | Navar et al. |
| 7,002,977 | B1 * | 2/2006 | Jogalekar ................... 370/410 |
| 7,012,919 | B1 * | 3/2006 | So et al. ..................... 370/392 |
| 7,127,056 | B2 * | 10/2006 | Hu et al. ................. 379/221.03 |
| 7,359,322 | B2 * | 4/2008 | Khurana et al. ............. 370/230 |
| 2002/0083174 | A1 * | 6/2002 | Hayashi et al. ............. 709/225 |
| 2003/0214938 | A1 | 11/2003 | Jindal et al. |
| 2005/0259586 | A1 * | 11/2005 | Hafid et al. .................. 370/241 |

OTHER PUBLICATIONS

International Search Report, dated Jun. 12, 2008 (2 pages).

* cited by examiner

*Primary Examiner*—Pankaj Kumar
*Assistant Examiner*—Duc T Duong
(74) *Attorney, Agent, or Firm*—Philip J. Feig

(57) ABSTRACT

A system and method of rearranging Label Switched Paths (LSPs) and rerouting traffic in a DiffServ-enabled Multi-Protocol Label Switched (MPLS) network is disclosed. The system periodically monitors network performance, and rearranges LSPs and reroutes traffic through existing or new Label Switched Paths (LSPs) based on network performance and network bandwidth utilized by various DiffServ classes.

17 Claims, 6 Drawing Sheets

DYNAMIC TRAFFIC REARRANGEMENT TO ENFORCE POLICY CHANGES IN MPLS NETWORKS

BACKGROUND OF THE INVENTION

This invention relates to a method of controlling data traffic through a network and in particular dynamically reconfiguring and creating label switched paths in a multi-protocol label switching network.

Traffic engineering is the ability to plan and control routing of traffic through a network while ensuring efficient and balanced utilization of network resources and providing a high quality of service to users of the network.

As traffic volume through the Internet has increased exponentially in recent years, traffic engineering has become a focus of network administrators. Administrators have struggled to deal with the increased demand placed on high speed networks. Although advances in traffic engineering have assisted administrators in providing faster routing methods for data flow through networks, a need still exists for methods of efficiently routing traffic.

One recent advancement in traffic engineering which was set fourth by the Internet Engineering Task Force for routing data through a network is known as multiprotocol label switching (MPLS). MPLS systems append headers to packets of information. The headers direct how the packets should be routed through the network. An MPLS system creates a set of label switched paths (LSPs) that provide pathways through an MPLS network for packets of data.

Another common technique that may be used to improve the Quality of Service (QoS) for traffic through a network is to categorize traffic into different classes. The different classes are then handled in different ways and data forwarding differentiation is given to the classes in accordance with a predetermined policy. This method is called differentiated services or DiffServ. These systems allow traffic engineers to take anticipated traffic flows into account when designing a network. In a DiffServ system, a packet of information that is classified with the highest priority (or preferred class) may be forwarded prior to a packet with a lower priority. In addition, a packet with the lower priority may be discarded during periods of extremely high network traffic. A DiffServ system allows traffic to be routed based on the importance of the traffic during periods of high network activity. DiffServ ensures that time critical network traffic, such as real-time voice, is sent through the network as quickly as possible. DiffServ classes may be set up based on anticipated traffic of different types for a network.

In a DiffServ-enabled MPLS system, each DiffServ class is typically allocated a bandwidth fraction on a number of LSPs. Further, to ensure that congestion does not occur in the network, a traffic admission control scheme (also called bandwidth management scheme) is used. In this scheme, before applications inject traffic into the network, they send a request message to the admission controller (also called bandwidth broker) specifying the bandwidth required for the traffic flow. Upon receipt of this request, the admission controller determines the LSP onto which the traffic is to be routed, verifies if the required bandwidth is available on that LSP, and admits the traffic only if the required bandwidth is available. This system works well as long as traffic conditions do not deviate from anticipated and projected conditions. Problems arise when deviations occur from the projected conditions. For example, if traffic in one DiffServ class is consistently above projected levels, admission controller will not admit new incoming traffic of that class and the applications will be denied network bandwidth, and these applications suffer from lack of network quality of service (QoS). On the other hand, if traffic in one DiffServ class stays much below the projected levels, LSPs allocated to that class will be underutilized. To alleviate these anomalies, bandwidth fraction allocated to particular DiffServ classes need to be adjusted such that the network provides bandwidth and thus QoS for applications and optimizes network resources.

Thus, a need exists for a network system which can accommodate increased traffic and dynamically adjust the flow of traffic through LSPs in an MPLS System.

SUMMARY OF THE INVENTION

In one preferred embodiment, the present invention comprises a method of controlling traffic of data through a network having a plurality of Label Switched Paths (LSPs) created with Multi-Protocol Label Switching (MPLS). The method comprises continually evaluating network bandwidth utilized on the plurality of LSPs by various DiffServ classes, determining if imbalances exist in this utilization statistics, i.e., utilization consistently exceeds a predetermined threshold for some classes while utilization is consistently below a threshold for some other classes, and generating a rearrange order to correct these imbalances. The rearrange order specifies the new bandwidth fraction to be allocated for each DiffServ class on the plurality of LSPs in the network.

The evaluation of LSP utilization may be continual or periodic, as determined by the network administrator. The evaluation preferably includes calculating the bandwidth used by each of a plurality of differentiated services classes. The evaluation may include comparing the bandwidth used by each of a plurality of differentiated services classes with a predetermined threshold for each particular class.

In one embodiment, the above method may also comprise generating and issuing a rearrange order if LSP utilization falls below a predetermined threshold. The LSP rearrangement generated to satisfy the rearrange order comprises a list of LSPs to be reconfigured, a list of one or more LSPs to be deleted, and a list of data flows to be reassigned from the one or more deleted LSPs. The list of LSPs to be reconfigured may include one or more LSPs from which traffic is to be rerouted to other LSPs or a list of data flows which are to be reassigned to other LSPs. Preferably, a minimal amount of new LSPs is created in order to accommodate network traffic.

In a further embodiment of the method, when the LSP utilization exceeds a predetermined threshold, the rearrange request is issued to a programming module which acts on the rearrange request by reconfiguring some LSPs by reassigning data flows, creating the one or more LSPs to be created, and reassigning data flows to the one or more new LSPs.

In another embodiment, when the LSP utilization falls below a predetermined threshold, the rearrange request is issued to a programming module which reconfigures some LSPs by reassigning data flows, deletes the one or more LSPs to be deleted, and reassigns data flows previously assigned to the deleted LSPs.

An alternate embodiment of the present invention may comprise a method of traffic engineering comprising classifying network traffic into different classes, assigning a data forwarding preference to each of the classes, assigning a plurality of paths to each of the classes, and periodically monitoring flow of traffic through the paths. If the flow of traffic through any of the paths exceeds a first predetermined limit, the method reassigns certain traffic to different paths. One or more new paths may also be created if traffic flow exceeds the first predetermined level through a predetermined number of paths. If the flow of traffic through any of the paths falls below a second predetermined limit, the method destroys the paths with traffic below the second predetermined limit and reassigns the traffic previously assigned to the destroyed paths. The paths in this method may be label switched paths. The second predetermined limit may be raised each time new paths are created.

The network administrator may set up the method such that the network traffic with the highest preference are preferably never destroyed.

In another embodiment, the step of reassigning traffic to different paths if the flow of traffic through any of the paths exceeds a first predetermined limit may comprise reassigning data traffic currently assigned to the path or paths that exceeds the first predetermined limit previously to paths that are assigned to classes with a lesser preference.

In an alternative embodiment, the present invention comprises a system used for traffic engineering in a network, the system preferably comprises means for monitoring network performance data and sending a rearrange order if LSP utilization exceeds a first predetermined level, means for responding to the rearrange order by evaluating which of a plurality of paths should be allocated a different amount of traffic according to traffic currently flowing through the plurality of paths, means for determining whether new paths should be created to channel increased network traffic and creating those new paths, and means for reallocating traffic between the plurality of paths and any new paths that have been created. The means for monitoring may also send a rearrange order if network traffic falls below a second predetermined level which may include deleting one or more paths.

DETAILED DESCRIPTION

A traffic engineering system and method according to the present invention is preferably implemented on a multi-protocol label switching (MPLS) network. The MPLS system used to implement the present invention has differentiated services (DiffServ) capabilities. This means that data is divided into classes and packets of data that flow through the network each contain a header which has information relating to how the packet is to be routed through the network. Packets in a MPLS system travel along label switched paths (LSPs). A number of LSPs are preferably allocated to each of a plurality of DiffServ classes. LSPs are configured with specific bandwidth and priority attributes based on traffic engineering policies that have been created by the network administrator. LSPs are preferably set up and released using a signaling protocol such as RSVP-TE or CR-LDP as known by those skilled in the art. LSPs are preferably configured with a primary path and zero or more backup paths. Thus, data travels through MPLS networks in packet form, in DiffServ classifications, along LSPs. U.S. application Ser. No. 11/048,370, the disclosure of which is incorporated herein by reference, includes additional disclosure relating to the system and methods described herein.

Figure 1:
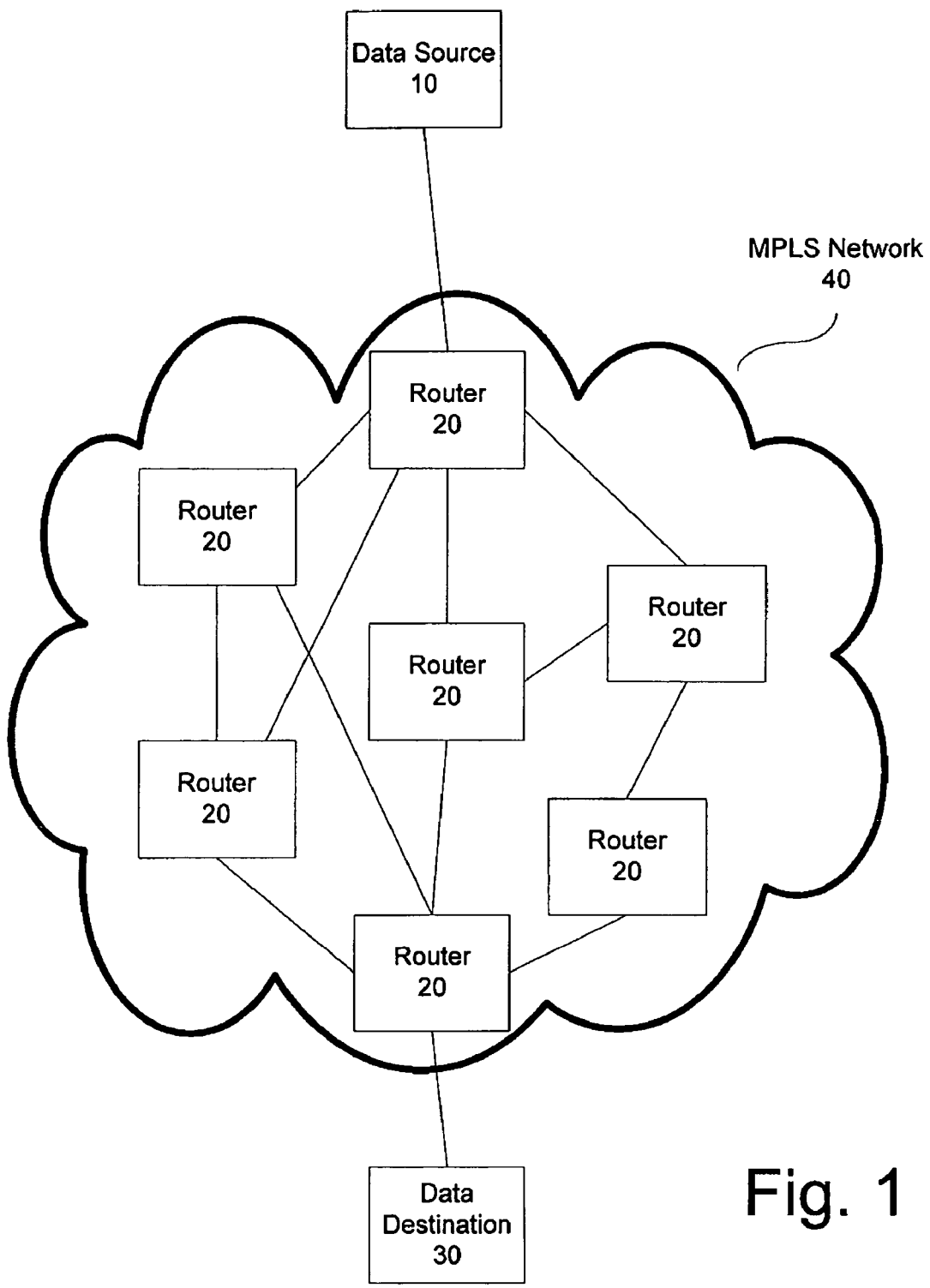
FIG. 1 is a diagram illustrating an MPLS network in accordance with an aspect of the present invention.

An embodiment of the invention will now be described with reference to the figures. FIG. 1 depicts one embodiment of an MPLS network which may be used to implement the system of the present invention. The MPLS network 40 preferably comprises a number of routers 20. The routers 20 receive data from outside the network from a data source 10 which may be a computer outside the network such as an IP address. Data flows in from the data source 10 to a router 20 and the network 40 determines the path of the data from one router 20 to other routers 20 until it reaches a data destination 30 outside the network 40. The various paths between the routers in an MPLS network are called links and are depicted by lines between the routers in FIG. 1. An LSP is a path through the network that travels along a plurality of these links. One skilled in the art would recognize that this is a simplified drawing of an MPLS network and various other embodiments are possible for the implementation of this invention.

Figure 2:
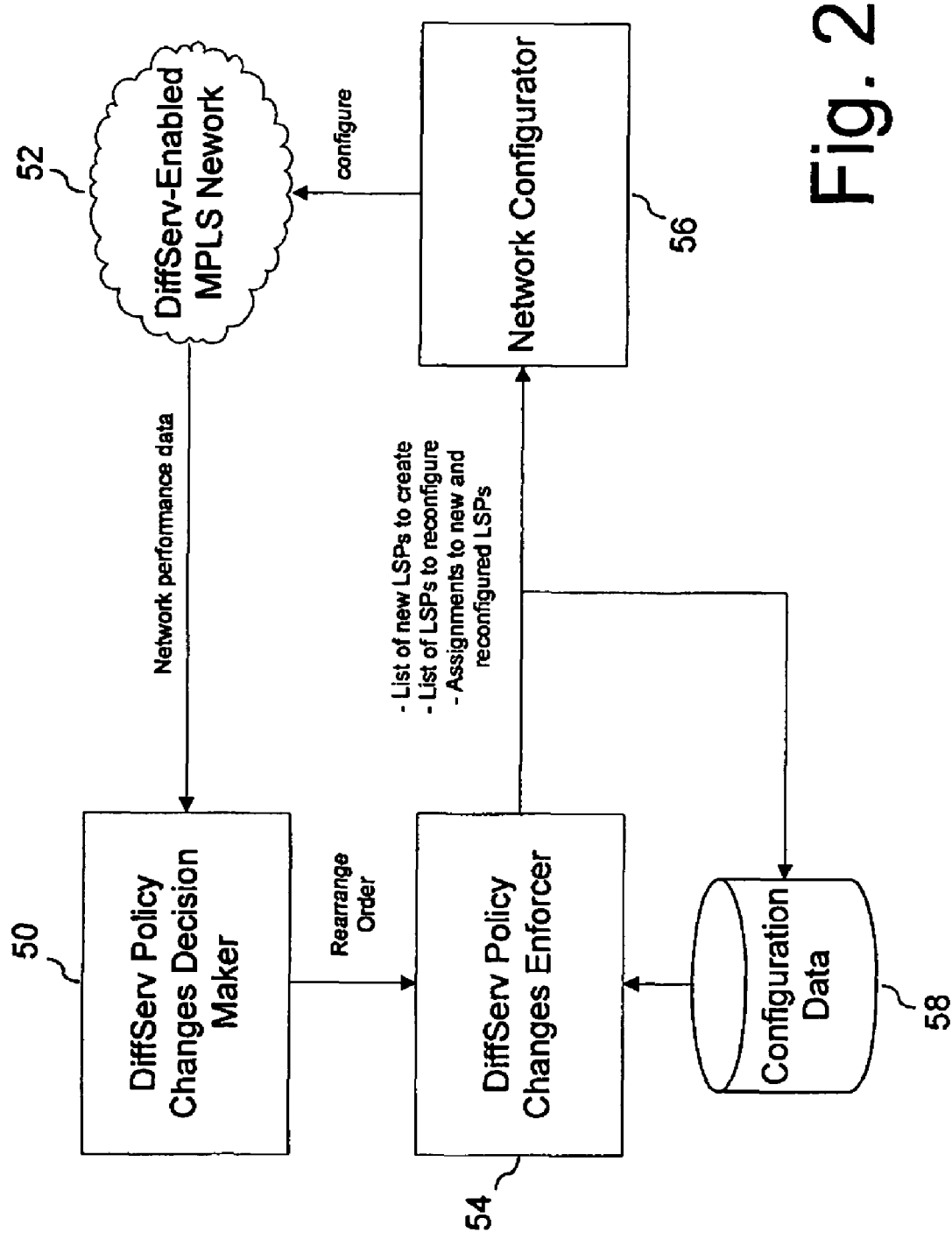
FIG. 2 is a diagram showing the interrelation of the various programming modules in accordance with an aspect of the present invention.

FIG. 2 depicts the various programming modules as they interact to embody present invention. The DiffServ policy changes decision maker (PCDM) 50 monitors the utilization of the LSPs in the MPLS network 52. The PCDM 50 constantly receives network performance data from the MPLS network 52 in order to monitor the LSPs. The PCDM 50 monitors the utilization of the LSPs on a DiffServ class basis meaning that each DiffServ class in the MPLS network 52 is allocated a plurality of LSPs and these LSPs are monitored by the PCDM 50. Based on the network performance data over a recently passed time period, the PCDM 50 may determine that LSPs that are allocated to one or more DiffServ classes are either over-utilized or under-utilized. The PCDM 50 may then issue a rearrange order computing a new bandwidth for each DiffServ class.

The second module depicted in FIG. 2 is the DiffServ policy changes enforcer (PCE) 54. While the PCDM 50 is continuously monitoring network performance, the PCE 54 becomes active only when a rearrange order is issued by the PCDM 50. In response to a rearrange order, the PCE 54 will actively reconfigure existing LSPs, create new LSPs, and assign traffic flows to the new LSPs and reconfigured LSPs in a way that minimizes impact on ongoing traffic. The PCE 54 is programmed to create a minimum number of LSPs to accommodate the increased traffic on the network. The PCE 54 takes the following information as input from the PCDM 50: rearrange requests. After the PCE 54 executes its processes, the PCE 54 outputs the following data: the list of the existing LSPs to reconfigure, the list of new LSPs to create, and data flows to be reassigned to new and reconfigured LSPs.

Figure 6:
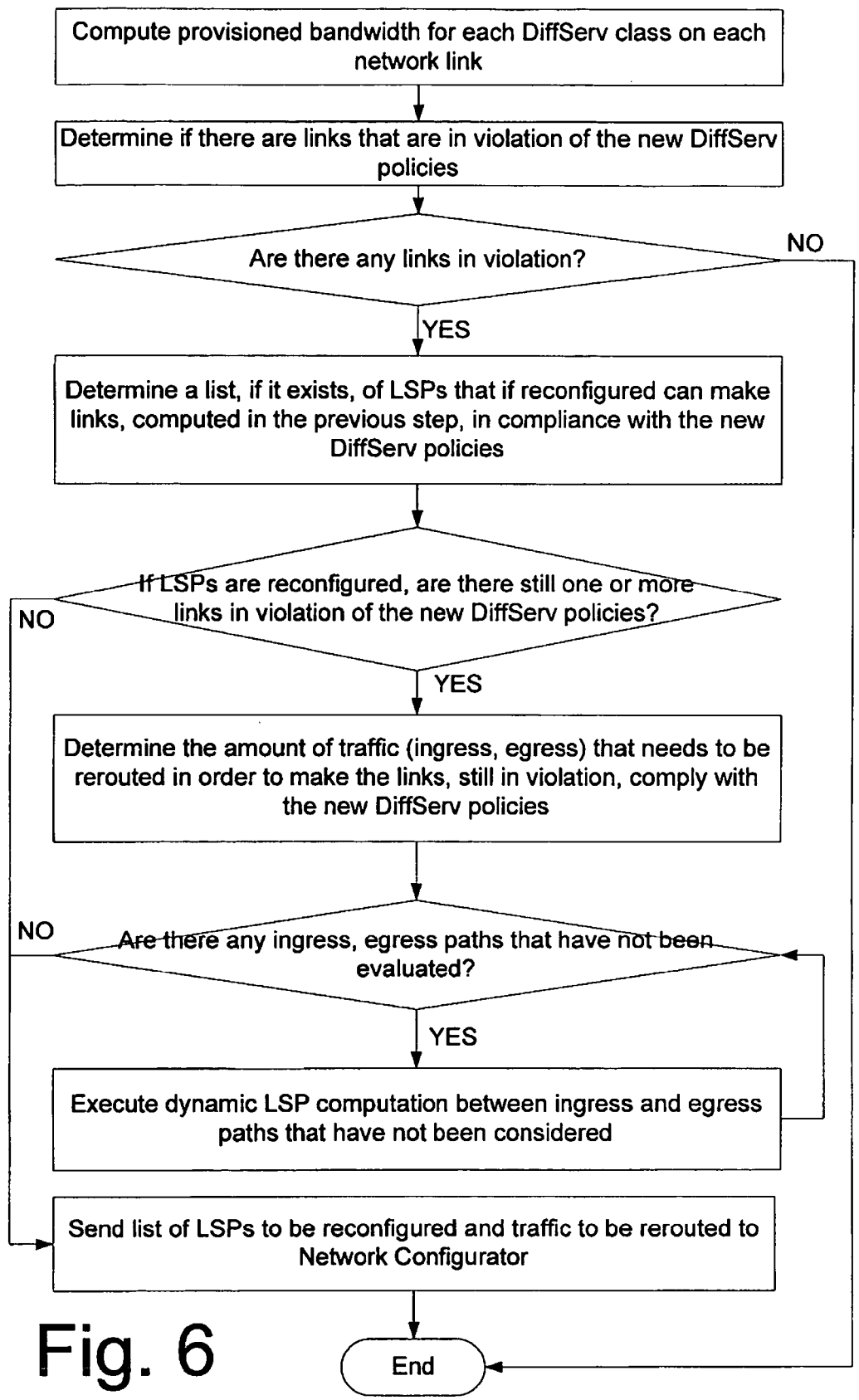
FIG. 6 is a flow diagram showing the steps of one embodiment of the present invention.

Upon receipt of a rearrange request, the PCE computes the provisioned bandwidth per DiffServ class on each of the network links. This step is shown in FIG. 6, which depicts a flow diagram of one embodiment of the invention, the steps of which will now be described. The PCE obtains a list of all links that are operational in the network and a list of the LSPs traversing these links and uses this information to calculate the provisioned bandwidth for that link. The PCE then uses the maximum capacity of the link and DiffServ policies for routing traffic over links to calculate the maximum capacity per DiffServ class.

After the PCE has calculated the capacities of the links by DiffServ class, the PCE will use this information to determine links in violation of their allotted maximum capacity as depicted in the second step of FIG. 6. If the provisioned bandwidth is higher than the maximum capacity for a given class, the link is in violation of the DiffServ policies. The PCE will perform this operation for each of the network links and produce a list of the links in violations. If there are no links in violation, the process ends and will be started over at the first step at the next predetermined time interval.

As shown in FIG. 6, if there are links in violation, the PCE will then identify the list of LSPs to reconfigure and thereby reduce the provisioned bandwidth of those LSPs. The PCE will also determine new LSPs to create which will reroute traffic and reduce bandwidth on violating links.

Once the PCE determines what LSPs to be reconfigured, it determines whether there will still be one or more links in violation of the new DiffServ policies. If not, the process list of LSPs to be reconfigured and traffic to be rerouted is sent to the Network Configurator and the process ends. If so, the PCE determines the amount of traffic that needs to be rerouted in order to make the links comply with the policies.

The PCE will then determine whether any ingress, egress paths have not been evaluated. If there are ingress, egress paths that have not been evaluated, the system will execute dynamic LSP computations between the ingress, egress paths that have not been considered until all such paths have been considered. Once all paths have been considered, a list of LSPs to be reconfigured and traffic to be rerouted is sent to the Network Configurator.

Whenever the PCE 54 receives a rearrange request from the PCDM 50 the processing of the PCE 54 results in producing (A) a list of existing LSPs to be reconfigured, (B) a list of new LSPs to be configured, and (C) a list of data flows to be reassigned or assigned to each LSP to be configured. The PCE 54 sends this information to the network configurator 56 as shown in FIG. 2. This information is also backed up in storage as configuration data 58 as shown. The network configurator 56 then configures the MPLS network as set forth in the data sent by the PCE 54.

If new LSPs are to be created, the following information is contained in the rearrangement result produced by PCE in order to configure each new LSP:
 LSP Id
 Ingress and egress interfaces
 Setup and holding priorities
 Total provisioned bandwidth for each DiffServ class supported by the LSP
 Explicit path of the LSP
 List of flows to carry on the LSP For each existing LSP to be reconfigured the following information is provided in the rearrangement result produced by PCE:
 LSP Id
 New total provisioned bandwidth for each DiffServ class supported by the LSP The configuration data shown in FIG. 2 consists of (1) network topology, (2) LSP data, and (3) flow data. The configuration data is updated whenever changes occur to this data. If changes are performed by the PCE 54, then the latter performs the update; otherwise, updates are performed by the other management components of the system. For example, Network Provisioning component stores network topology and initial traffic engineering information in the configuration data. Admission Control component stores traffic flow information in the configuration data. Thus, any time a flow is allowed (or terminated) to the network, a new LSP is created, an existing LSP is reconfigured (e.g., rerouted, bandwidth reduced, etc.) or removed, an LSP failed or repaired, updates are performed.

The following information is contained in the configuration data:
 1. Network Topology Network topology consists of the list of links and routers/nodes of the network. For each link that connects two routers in the network, the following information is supplied:
 Link identification
 IP address of the two interfaces connected by the link
 Maximum capacity in Mbps
 Status: failed/operational For each router in the network, the following information is supplied:
 Router Id
 List of IP addresses of the interfaces of the router
 2. LSP Data LSP data consists of the list of LSPs that are set up in the network. For each LSP the following information is supplied:
 LSP Id
 IP address of the source end of an LSP
 IP address of the destination end of an LSP
 Total provisioned bandwidth for each DiffServ class supported by the LSP. The sum of provisioned bandwidth for all DiffServ classes supported by the LSP is equal to the bandwidth provisioned for the LSP, at LSP setup time, by the network.
 Total allocated (i.e., used) bandwidth for each DiffServ class supported by the LSP. This corresponds to the amount of bandwidth that has been assigned to traffic/flows allowed into the network and carried by the LSP
 Path: ordered sequence of the links traversed by the LSP
 3. Flow Data Flow data consists of the list of flows that are accepted in the network. For each flow the following information is supplied:
 Flow Id
 IP address of flow source
 IP address of flow destination
 Priority; this is a user/application level attribute
 Bandwidth
 DiffServ class
 LSP: the LSP carrying the flow (i.e., the flow is assigned to this LSP)

Because network traffic tends to occur in spurts, the PCDM may also be used to evaluate network performance data and issue rearrange orders to the PCE when network traffic belonging to some DiffServ classes has reduced. This prevents the rendering of certain LSPs inactive or under-utilized. The PCE may then create a list of LSPs to deactivate or remove. In addition, the PCE may create a list of LSPs which may be reconfigured. The PCE may assign data traffic to reconfigured LSPs in order to more efficiently utilize the resources of the network in order to properly route traffic through the network. In this way the present system adjusts to periods of heavy traffic and periods of light traffic by dynamically adjusting the network so that the network continues to run at maximum efficiency regardless of the amount of network traffic.

An example of the system according to the present invention will now be described. In a MPLS network with DiffServ capabilities, three DiffServ classes may exist: gold, silver and bronze. All data traffic is allocated to one of these three DiffServ classes. The MPLS network is set up such that each of these three DiffServ classes is allocated a plurality of LSPs. Periodically, the PCDM will evaluate the performance of the MPLS network. If, for example, the silver class is overloading the LSPs allocated to silver and the LSPs are unable to properly route the silver class of traffic, the PCDM may issue a rearrange order to the PCE. The PCE may create new LSPs to route the additional silver traffic, or may evaluate whether the gold and bronze classes are utilizing all of the LSPs allocated to them. The PCE may decide to allocate some of the LSPs allocated to the gold class to the silver class if gold is under-utilizing the LSPs allocated to it. Alternatively, the PCE may decide to allocate some of the silver traffic to LSPs previously allocated to bronze traffic because silver traffic is given priority over the bronze traffic. The network configurator will receive a list of changes from the PCE and modify the MPLS network accordingly.

In a second example, if the PCDM evaluates network performance and determines that all three DiffServ classes of gold, silver and bronze are overloaded, the PCDM may issue a rearrange order to the PCE specifying a new bandwidth policy, i.e., fraction of network bandwidth to be allocated for each DiffServ class. The PCE may determine that it is more efficient to create new LSPs in order of traffic preference. In this case, the PCE will give preference to the gold DiffServ class which has been previously set up as preferential. The PCE may reallocate LSPs previously allocated to bronze traffic in order to accommodate more gold traffic which may result in the loss or delay of some bronze traffic. This example illustrates that the preferential DiffServ classes dictate how the PCE chooses to create new LSPs or reconfigure existing LSPs.

Figure 3:
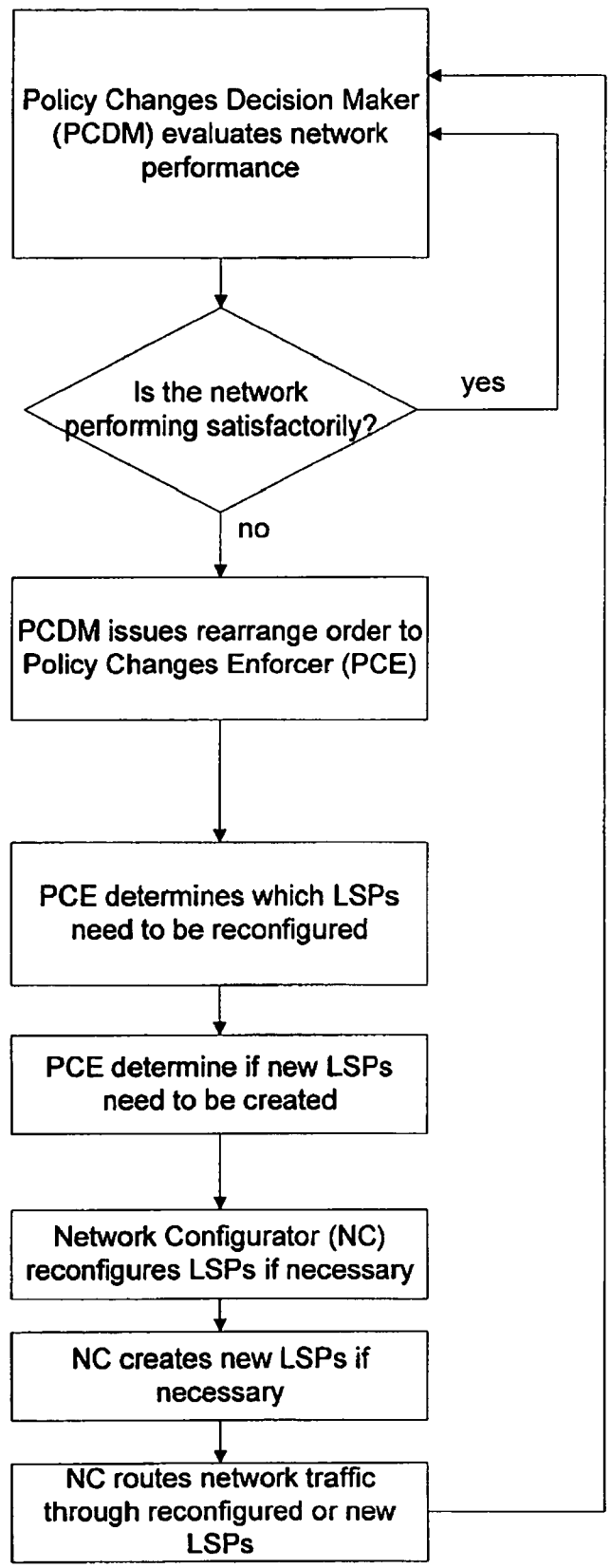
FIG. 3 is a flow diagram showing the steps of one embodiment of the present invention.

FIG. 3 depicts a flow diagram of one method according to the present invention. In FIG. 3 the PCDM evaluates network performance periodically. If the network is performing satisfactorily, the PCDM takes no action. If the network is not performing up to a predetermined standard, the PCDM will issue a rearrange order to the PCE. The PCE receives the rearrange order and configuration data stored concerning the network and determines which LSPs need to be reconfigured, if any. The PCE then determines if new LSPs need to be created to properly accommodate traffic flow. If the PCE determines that new LSPs need to be created, the PCE issues a list of new LSPs to be created, a list of LSPs to be reconfigured, and flow assignments to all reconfigured and new LSPs to the network configurator. The network configurator (NC) reconfigures LSPs, creates new LSPs, and routes network traffic through the reconfigured or new LSPs as dictated by the information sent by the PCE. Once the changes have been made the PCDM once again evaluates network performance on a regular basis and issues rearrange orders are needed while the network is in operation.

Figure 4:
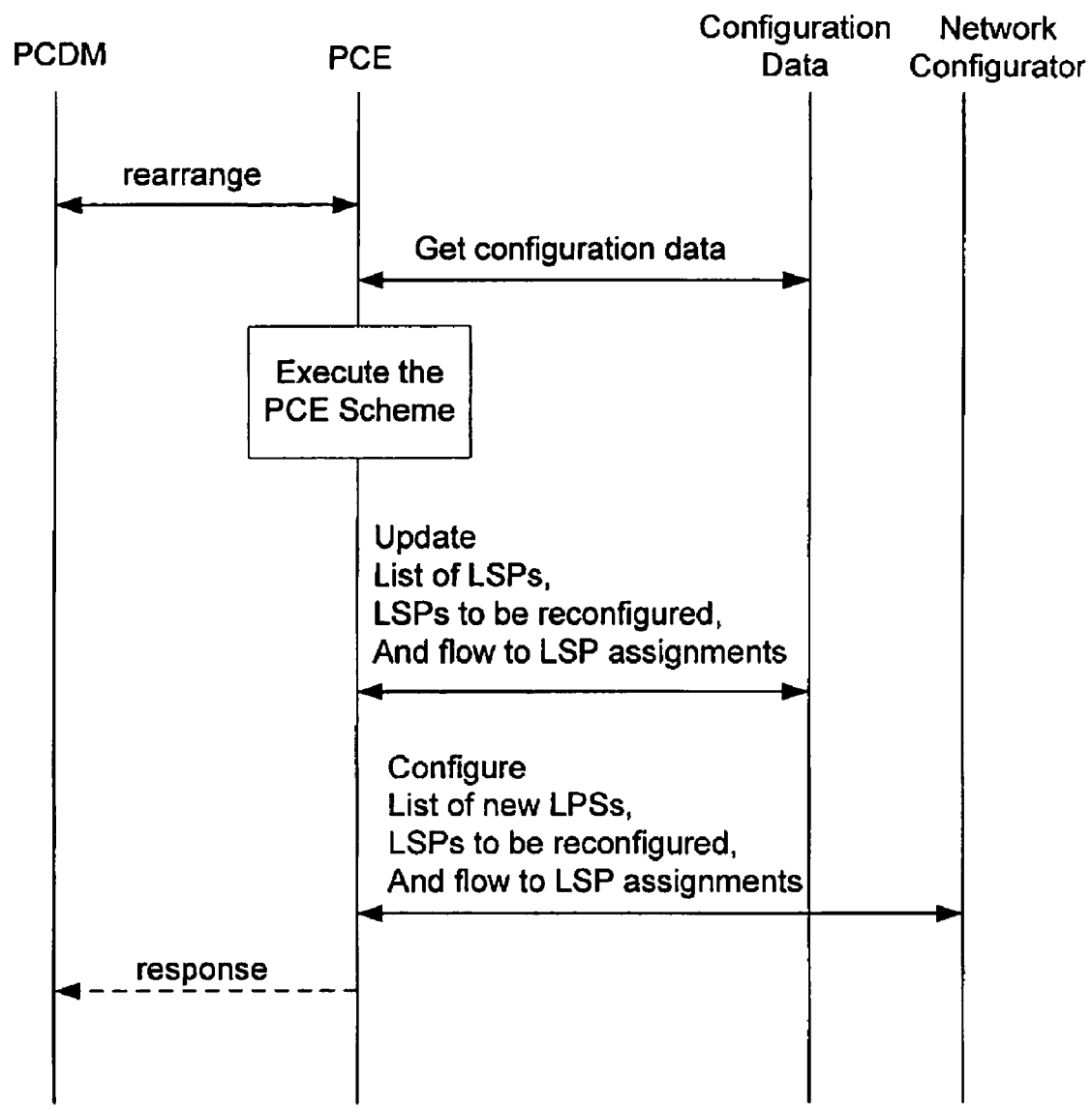
FIG. 4 is a flow diagram showing the steps of one embodiment of the present invention.

FIG. 4 depicts the behavior of the PCE in response to a rearrange request in relation to the various components of the invention depicted in FIG. 2.

The table reproduced below, Table 1, contains pseudo-code showing the input and output used by the PCE to determine LSPs to be reconfigured.

TABLE 1

```
Input
    violatedLinks={ <Link1, [DiffServClass1, ViolatedBW11],
        [DiffServClass2, ViolatedBW12], ... >, <Link2,
        [DiffServClass1, ViolatedBW21], [DiffServClass2,
        ViolatedBW22], ... >, ... }
    DSC is the number of diffServ classes enabled in the
        network;
    /* {diffServClass1, ... DiffServClassDSC} is the list of
    diffServ classes enabled in the network* /
Output
    reconfiguredAvailableBWLSPs = [(LSP1, {<DiffServClass1,
        BW11>, <DiffServClass2, BW12>, ... }), (LSP2,
        {<DiffServClass1, BW21>, <DiffServClass2, BW22>, ... }), ... ]
        /* the first element of reconfiguredAvailableBWLSPs means
        that bandwidth of LSP1 should be reduced by BW11 for
        diffServClass1, by BW12 for DiffServClass2, ... * /
    reconfiguredAllocatedBWLSPs = [(LSP1, {<DiffServClass1,
        BW11>, <DiffServClass2, BW12>, ... }), (LSP2,
        {<DiffServClass1, BW21>, <DiffServClass2, BW22>, ... }), ... ]
        /* the first element of reconfiguredAllocatedBWLSPs means
        that the bandwidth of LSP1 should be reduced by BW11 for
        diffServClass1, by BW12 for DiffServClass2, ... ; in this
        case the bandwidth reduction causes the rerouting of
        traffic to new LSPs* /
    violatedLinks={<Link1, [DiffServClass1, ViolatedBW11],
        [DiffServClass2, ViolatedBW12], ... >, <Link2,
        [DiffSrvClass1, ViolatedBW21], [DiffServClass2,
        ViolatedBW22], ... >, ... }
        /* this list may be empty * /
    flowsToReroute={ <flowi, LSPj>, ... }
        /* flowi should be rerouted from LSPj * /
Variables
    i, j, k, k0, linkLen, lspLen, n, m are integers
    maxAvailableBW, BWToReduce, trafficToReduce are integers;
    maxViolatedLinks is a list of integers
    linksInLSP1, linksInLSP2, ... linksInLSPi, ... are integers;
    initially, they are set to 0;
    allLSPs, linkLSPs are lists of LSPs; initially they are
    empty
    violatedLinks1, violatedLinks2, ... violatedLinksi, ... are
    lists of links; e.g., violatedLinks1={<Linkj,
    [DiffServClass1, ViolaedBWj1]>, <Link1, [DiffServClass1,
    ViolatedBW11]>, ... }, ...
    diffServToChange is a set of pairs <diffServClass, BW>
    flowsToReroute is set of pairs <flow, LSP>
```

The table reproduced below, Table 2, contains an algorithm used in one embodiment of the invention for determining LSPs to reconfigure by reducing their provisioned bandwidth.

TABLE 2

```
Begin
For (n=1; n<DSC+1, ++n)
    violatedLinksn=a subset of violatedLinks, such that linki is in
    violatedLinksn iff ViolatedBWin>0
        /* violatedLinksn includes links that are in violation with
            respect to DiffServClassn* /
EndFor
For (n=1; n<DSC+1, ++n)
    While (violatedLinksn is not empty)
        linkLen=size of of violatedLinksn;
        For (i=1; i<linkLen+1, ++i)
            Get the list of LSPs, linkLSPs, that traverse the ith element
            of violatedLinksn; only LSPs with available bandwidth, for
            diffServClassn, bigger than 0 are considered
                /* this information is provided by the configuration data * /
```

TABLE 2-continued

```
            While (linkLSPs is not empty) do
                Remove the first element, LSPj, from linkLSPs
                linksInLSPj=linksInLSPj+1;
                    /*linksInLSPj is the number of violating links, in
violatedLinksn, traversed by LSPj*/
                If (LSPj is not in allLSPs)
                    Add LSPj to allLSPs
                EndIf
            EndWhile
        EndFor
        If (allLSPs is empty)
            Continue
                /* consider the next diffServClass*/
        EndIf
        Compute the list, maxViolatedLinks, such that if x is in
        maxViolatedLinks then linksInLSPx=maximum (linksInLSPj) for
        all j such that LSPj is in allLSPs
            /*MaxViolatedLinks includes the indexes of LSPs that traverse
            the maximum number of violating links; it may include one or
            more indexes*/
        maxAvailableBW=0;
        While (maxViolatedLinks is not empty)
            k=remove first element of maxViolatedLinks
            if (the available bandwidth of LSPk for diffServClassn is
            bigger than maxAvailableBW) then
                maxAvailableBW= available bandwidth of LSPk for
dffServClassn;
                k0=k;
            EndIf
        EndWhile
        Get the list, linksInLSP. of links traversed by LSPk0
            /* this information is provided by the configuration data */
        diffServToChange={ }
        For (m=1; m<DSC+1, ++m)
            /* now that an LSP is selected for bandwidth reduction for
            diffServClassn, we consider also reducing the bandwidth of
            other diffServ classes for the same LSP ; this may help
            reducing the number of LSP to reconfigure*/
            maxAvailableBW=available bandwidth in LSPk0 for diffServClassm
                /* this information is provided by the configuration data*/
            violatedLinksInLSP={ } ;
            While (linksInLSP is not empty)
                x=remove first element in linksInLSP
                If (x is in violatedLinksm) then
                    violatedLinksInLSP=violatedLinksInLSP +{x}
                EndIf
            EndWhile
                /*violatedLinksInLSP includes the list of violating links,
                with respect to diffServClassm traversed by LSPk0*/
            maxViolatedBW=maximum (ViolatedBWim) for all i such that Linki
            is in violatedLinksInLSP
                /*ViolatedBWim is the amount of bandwidth in violation by
                    Linki for diffServClassm; this information is provided as
                    input, violatedLinks, and updated by the algorithm*/
            BWToReduce=minimum (maxAvailableBW, maxViolatedBW)
            While (violatedLinksInLSP is not empty)
                x=remove first element in violatedLinksInLSP
                x is in violatedLinksm, thus, it exists i such that x=linki
                if (violatedBWim>BWToReduce) then
                    violatedBWim=violatedBWim-BWToReduce
                    update Linki in violaledLinksm (and violatedLinks) with the
new violatedBWim
                else
                    remove Linki from violatedLinksm
                    update Linki in violatedLinks with the new violatedBWim
which is equal to 0
                EndIf
                diffServToChange=diffServToChange+{<diffServClassm,
BWToReduce>}
            EndWhile
        EndFor
        reconfiguredAvailableBWLSPs=reconfiguredAvailableBWLSPs+{(LSPk0,
        diffServToChange)}
```

TABLE 2-continued

```
    EndWhile
EndFor
Return reconfiguredAvailableBWLSPs and violatedLinks
    /*violatedLinks represents an input to the next step described
below in Table 3 */
End
```

The table reproduced below, Table 3, contains an algorithm used in one embodiment of the invention for determining LSPs to reconfigure by reducing their allocated bandwidth.

TABLE 3

```
Begin
For (n=1; n<DSC+1, ++n)
    violatedLinksn=a subset of violatedLinks, such that linki
    is in violatedLinksn iff ViolatedBWin>0
        /* violatedLinksn includes links that are in violation
            with respect to DiffServClassn* /
    While (violatedLinksn is not empty)
        linkLen=size of violatedLinksn;
        For (i=1; i<linkLen+1, ++i)
            Get the list of LSPs, linkLSPs, that traverse the ith
            element of violatedLinksn; only LSPs with allocated
            bandwidth, for diffServClassn, bigger than 0 are
            considered
                /* this information is provided by the configuration
data */
            While (linkLSPs is not empty) do
                Remove the first element, LSPj, from linkLSPs
                linksInLSPj=linksInLSPj+1;
                    /*linksInLSPj is the number of violating links, in
violatedLinksn, traversed by LSPj* /
                If (LSPj is not in allLSPs)
                    Add LSPj to allLSPs
                EndIf
            EndWhile
        EndFor
        If (allLSPs is empty)
            Continue
                /* consider the next diffServClass* /
        EndIf
        Compute the list, maxViolatedLinks, such that if x is in
        maxViolatedLinks then linksInLSPx=maximum (linksInLSPj)
        for all j such that LSPj is in allLSPs
            /*MaxViolatedLinks includes the indexes of LSPs that
            traverse the maximum number of violating links; it may
            include one or more indexes* /
        maxAllocatedBW=0;
        While (maxViolatedLinks is not empty)
            k=remove first element of maxViolatedLinks
            if (the allocated bandwidth of LSPk for diffServClassn
            is bigger than maxAllocatedBW) then
                maxAllocatedBW= allocated bandwidth of LSPk for
diffServClassn;
                k0=k;
            EndIf
        EndWhile
        Get the list, linksInLSP. of links traversed by LSPk0
            /* this information is provided by the configuration
data */
        violatedLinksInLSP={ };
        While (linksInLSP is not empty)
            x=remove first element in linksInLSP
            If (x is in violatedLinksn) then
                violatedLinksInLSP=violatedLinksInLSP +{x}
            EndIf
        EndWhile
            /*violatedLinksInLSP includes the list of violating
                links, with respect to diffServClassn traversed by
                LSPk0* /
        maxViolatedBW=maximum (ViolatedBWin) for all i such that
```

TABLE 3-continued

```
        Linki is in violatedLinksInLSP
            /*ViolatedBWin is the amount of bandwidth in violation
                by Linki for diffServClassn; this information is
                provided as input, violatedLinks, and updated by the
                algorithm*/
        Get the list of flows, flowsInLSP, of diffServClassn,
carried by LSPk0;
            /* this information is provided by the configuration
data */
        Order the flows in flowsInLSP starting from the lowest
        priority flow to the highest priority flows; for flows
        with the same priority, order from the flow with the
        highest bandwidth to the lowest bandwidth requirement
            /* "low priority and wide first" heuristic */
        trafficToReroute=0
        While ((flowsInLSP is not empty) and
                (trafficToReroute<=maxViolatedBW))
            /* flowsInLSP is the ordered lit of flows*/
            x=remove the first element of flowsInLSP
            trafficToReroute=trafficToReroute+bandwidth of x
                /* x is provided by the configuration data; indeed,
                    the configuration data keeps track of flow records
                    that include bandwidth, priority, flow-LSP
                    assignment, etc. */
            flowsToReroute=flowsToReroute+{<x, LSPk0>}
                /*the flow x should be rerouted from LSPk0 */
        EndWhile
        reconfiguredAllocatedBWLSPs=addToLSP
        (reconfiguredAllocatedBWLSPs, {LSPk0, <diffServClassn,
        trafficToReroute>}
            /* this function adds the pair (LSPk0,
                <diffServClassn, trafficToReroute>} to
                reconfiguredAllocatedBWLSPs in a way to produce a
                list of the form reconfiguredAlloctedBWLSPs as shown
                in the output section */
        While (violatedLinksInLSP is not empty)
            x=remove first element in violatedLinksInLSP
            x is in violatedLinksn, thus, it exists i such that
x=linki
            if (violatedBWin>trafficToReroute) then
                violatedBWin=violatedBWin-trafficToReroute
                update Linki in violaledLinksn (and violatedLinks)
with the new violatedBWin
            else
                remove Linki from violatedLinksn
                update Linki in violatedLinks with the new
violatedBWin which is equal to 0
            EndIf
        EndWhile
    EndWhile
EndFor
Return flowsToReroute and reconfiguredAllocatedBWLSPs
    /* violatedLinks is empty when this process terminates */
End
```

Figure 5:
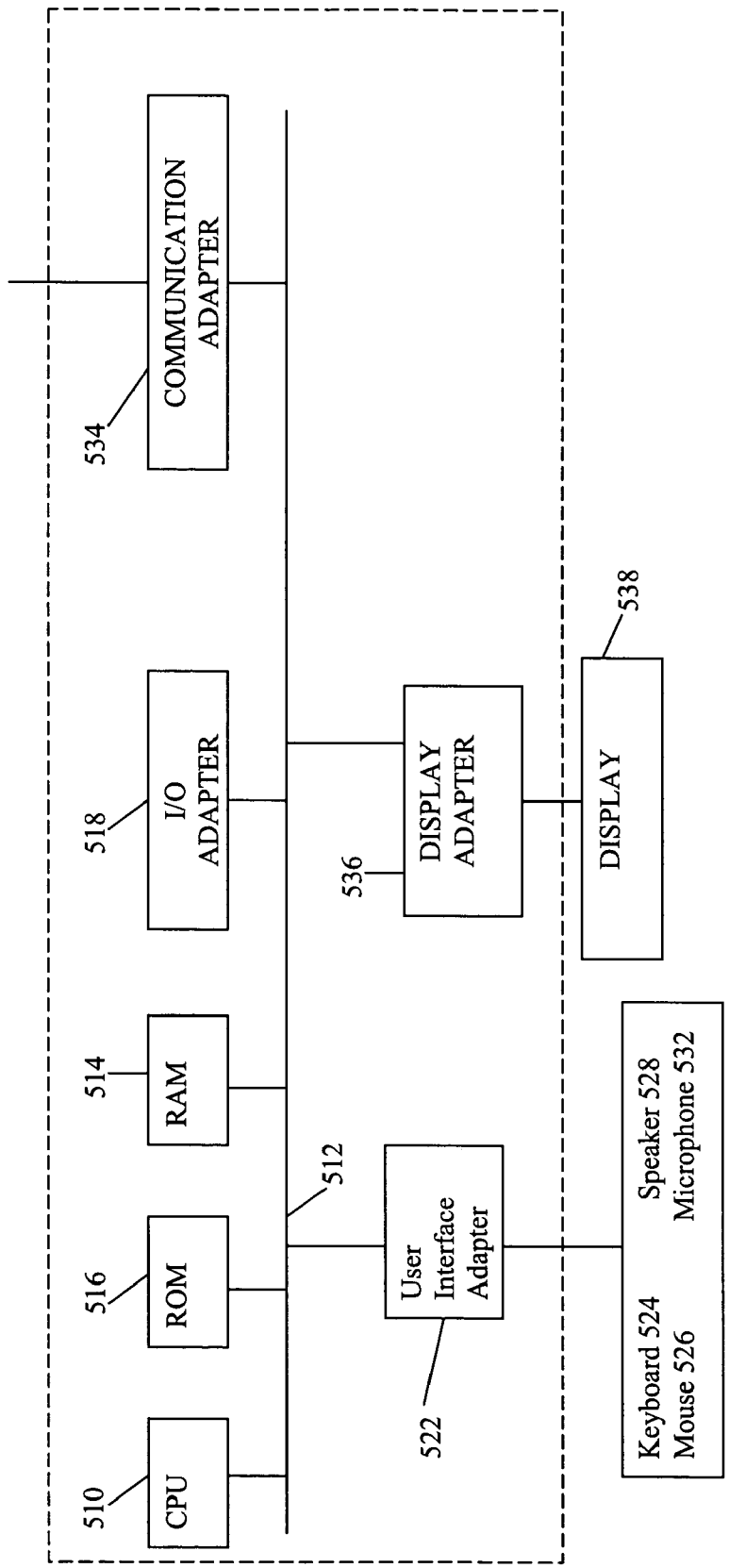
FIG. 5 is one embodiment of a computer system which may be used to implement the present invention.

The various programming modules and devices 50, 54, or 56, described above may be implemented using a general purpose machine, such as shown for example in FIG. 5, that supports a Windows, Linux, UNIX, Mac, or other operating system. The communication between the modules/devices and the network 52 may be realized using telnet, SNMP, as well as other methods known in the art. Communications among the modules/devices may be realized using CORBA or RMI as well as other protocols.

FIG. 5 describes an example of a machine or workstation on which the various modules and pseudo-code described above may reside and form instructions that operate as described above.

In particular, FIG. 5 illustrates a typical hardware configuration of a workstation or a computer in accordance with a preferred embodiment having a central processing unit 510, such as a microprocessor, and a number of other units interconnected via a system bus 512. The workstation includes a random access memory (RAM), 514 read only memory (ROM) 516, and I/O adapter 518 for connecting peripheral devices such as a disc storage unit (not shown) to the bus 512. The workstation also includes a user interface adapter 522 for connecting a keyboard 524, a mouse 526, one or more speakers 528, a microphone 532, and/or other user interface devices such as a touch screen (not shown) to the bus 512. Communication adapter 534 is also provided and is used for connecting the workstation to a communications network (e.g., the Internet). A display adapter 536 is also provided and is used for connecting the bus 512 to a display device 338. The workstation typically has resident thereon at least one operating system such as the Microsoft Windows operating system, the IBM OS/2 operating system, or the MAC or UNIX operating systems. In addition, the ROM 516 is preferably used to store instructions or one or more programs that embody instructions in accordance with the methods described above. The programs are processed by the CPU 510 to execute the methods and bring about the results described above. The programs or instructions may be written using JAVA, C, or the C++ language and may utilize object-oriented programming and methodologies.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of controlling traffic of data through a network, the network having a plurality of Label Switched Paths (LSPs) created with Multi-Protocol Label Switching (MPLS), the method comprising:
    (a) monitoring network traffic through the plurality of LSPs and determining utilization of LSPs on a DiffServ class basis;
    (b) if LSP utilization for one or more classes exceeds a predetermined threshold, issuing a rearrange request comprising:
        (i) a new policy on network bandwidth fraction to be allocated for each DiffServ class
    (c) computing LSP rearrangement in response to a rearrange request wherein a list of LSPs reconfigured includes one or more LSPs from which traffic is to be rerouted to other LSPs.

2. The method of claim 1 wherein the list of LSPs reconfigured includes a list of data flows which are reassigned to other LSPs.

3. The method of claim 1 wherein the least amount of LSPs is created in order to accommodate the rearrange request.

4. A method of controlling traffic of data through a network, the network having a plurality of Label Switched Paths (LSPs) created with Multi-Protocol Label Switching (MPLS), the method comprising:
    (a) monitoring network traffic through the plurality of LSPs and determining utilization of LSPs on a DiffServ class basis;
    (b) if LSP utilization for one or more classes exceeds a predetermined threshold, issuing a rearrange request comprising:
        (i) a new policy on network bandwidth fraction to be allocated for each DiffServ class,
    wherein the rearrange request is issued to a programming module which (i) reconfigures some LSPs by reducing their provisioned and/or allocated bandwidth, (ii) creates one or more LSPs, and (iii) reassigns data flows to the one or more new LSPs.

5. A method of controlling traffic of data through a network, the network having a plurality of Label Switched Paths (LSPs) created with Multi-Protocol Label Switching (MPLS), the method comprising:
    (a) monitoring network traffic through the plurality of LSPs and determining utilization of LSPs on a DiffServ class basis;
    (b) if LSP utilization for one or more classes exceeds a predetermined threshold, issuing a rearrange request comprising:
        (i) a new policy on network bandwidth fraction to be allocated for each DiffServ class
    (c) if LSP utilization for one or more DiffServ classes falls below a predetermined threshold, issuing a rearrange request comprising:
        (i) a new policy on network bandwidth fraction to be allocated for each DiffServ class,
    wherein the rearrange request is issued to a programming module which (ii) deletes one or more LSPs, and (iii) reassigns data flows previously assigned to the deleted LSPs.

6. A method of traffic engineering comprising:
    (a) classifying network traffic into different classes;
    (b) assigning a data forwarding policy to each of the classes;
    (c) assigning a plurality of paths to each of the classes;
    (d) periodically monitoring flow of traffic through the paths;
    (e) if the flow of traffic through any of the paths exceeds a first predetermined limit, reassigning certain traffic to different paths; and
    (f) if the flow of traffic through any of the paths falls below a second predetermined limit, destroying the paths with traffic below the second predetermined limit and reassigning the traffic assigned to the destroyed paths.

7. The method of claim 6 wherein the paths are label switched paths.

8. The method of claim 7 wherein traffic with the highest preference are never destroyed to the extent possible.

9. The method of claim 6 wherein the step of assigning a plurality of paths to each of the classes further comprises assigning a number of paths to a class based on the class's preference such that the class with the highest preference is assigned the most paths.

10. The method of claim 6 wherein the step of reassigning traffic to new paths if the flow of traffic through any of the paths exceeds a first predetermined limit further comprises creating at least one new path.

11. The method of claim 6 wherein the step of reassigning traffic to new paths if the flow of traffic through any of the paths exceeds a first predetermined limit further comprises creating at least one new path if traffic through a predetermined number of paths exceeds the first predetermined limit.

12. The method of claim 6 wherein the step of reassigning traffic to different paths if the flow of traffic through any of the paths exceeds a first predetermined limit comprises reassigning data traffic currently assigned to the path or paths that exceeds the first predetermined limit previously to paths that are assigned to classes with a lesser preference.

13. A system of traffic engineering comprising:
    (a) means for classifying network traffic into different classes;
    (b) means for assigning a data forwarding policy to each of the classes;
    (c) means for assigning a plurality of paths to each of the classes; and
    (d) means for periodically monitoring flow of traffic through the paths wherein
    if the flow of traffic through any of the paths exceeds a first predetermined limit, reassigning certain traffic to different paths; and
    if the flow of traffic through any of the paths falls below a second predetermined limit, destroying the paths with traffic below the second predetermined limit and reassigning the traffic assigned to the destroyed paths.

14. The system of claim 13 wherein the paths are label switched paths.

15. The system of claim 14 wherein paths with traffic with the highest preference are never destroyed to the extent possible.

16. The system of claim 13 wherein said means for assigning a plurality of paths to each of the classes further comprises means for assigning a number of paths to a class based on the class's preference such that the class with the highest preference is assigned the most paths.

17. The system of claim 13 wherein reassigning traffic to different paths if the flow of traffic through any of the paths exceeds a first predetermined limit further comprises creating at least one new path.

\* \* \* \* \*